United States Patent
Chandrasekaran

(10) Patent No.: US 11,582,331 B2
(45) Date of Patent: Feb. 14, 2023

(54) HANDLING SIP MESSAGES WITH MALFORMED HEADER FIELDS

(71) Applicant: T-Mobile USA, Inc., Bellevue, WA (US)

(72) Inventor: Karthik Chandrasekaran, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 16/989,649

(22) Filed: Aug. 10, 2020

(65) Prior Publication Data

US 2022/0046119 A1  Feb. 10, 2022

(51) Int. Cl.
*H04L 69/22* (2022.01)
*H04L 69/40* (2022.01)
*H04W 4/90* (2018.01)
*H04L 65/1016* (2022.01)
*H04L 65/1104* (2022.01)

(52) U.S. Cl.
CPC .......... *H04L 69/22* (2013.01); *H04L 65/1016* (2013.01); *H04L 65/1104* (2022.05); *H04L 69/40* (2013.01); *H04W 4/90* (2018.02)

(58) Field of Classification Search
CPC . H04L 69/22; H04L 65/1006; H04L 65/1016; H04L 69/40; H04W 4/90
See application file for complete search history.

(56) References Cited

U.S. PATENT DOCUMENTS

| | | | | |
|---|---|---|---|---|
| 8,689,328 B2* | 4/2014 | Ormazabal | ......... | H04L 63/1416 726/22 |
| 2004/0117657 A1* | 6/2004 | Gabor | ................. | H04L 65/1069 726/4 |
| 2007/0110053 A1* | 5/2007 | Soni | ..................... | H04L 63/0263 370/389 |
| 2007/0121596 A1* | 5/2007 | Kurapati | ........... | H04L 29/06027 370/356 |
| 2009/0138954 A1* | 5/2009 | Won | ........................ | H04L 63/10 726/11 |
| 2011/0216767 A1* | 9/2011 | Ballard | ................... | H04L 12/56 370/389 |
| 2012/0210421 A1* | 8/2012 | Ormazabal | ......... | H04L 63/1458 726/22 |

(Continued)

*Primary Examiner* — Khaled M Kassim
(74) *Attorney, Agent, or Firm* — Lee & Hayes, P.C.

(57) ABSTRACT

Described herein are techniques, devices, and systems for handling Session Initiation Protocol (SIP) messages with malformed header fields. A communication device that receives a SIP message from an additional communication device may identify one or more identified header fields of a plurality of first header fields in a message header of the SIP message that correspond to (e.g., match) one or more second header fields in a list of second header fields accessible to the communication device. If the communication device determines that the one or more identified header fields are not malformed, the communication device may process the SIP message without regard to remaining header fields in the message header. If, however, the communication device determines that at least one identified header field of the one or more identified header fields is malformed, the communication device may reject the SIP message.

20 Claims, 10 Drawing Sheets

(56) References Cited

U.S. PATENT DOCUMENTS

| | | | |
|---|---|---|---|
| 2012/0240185 A1* | 9/2012 | Kapoor | H04L 63/20 |
| | | | 726/1 |
| 2013/0163426 A1* | 6/2013 | Beliveau | H04L 47/2441 |
| | | | 370/235 |
| 2017/0257388 A1* | 9/2017 | Addepalli | H04L 63/1458 |
| 2018/0189483 A1* | 7/2018 | Litichever | G06F 21/554 |
| 2019/0044856 A1* | 2/2019 | Fischetti | H04L 45/745 |

* cited by examiner

SIP Message 308

Message Header 110

INVITE sip:911;phone-context=city@194.168.1.12;user=phone SIP/2.0
From: "voip_911_user1"<sip:voip_911_user1@contapa.com>;epid=1D12040AED;tag=d07d64d924
To: <sip:911;phone-context=city@194.168.1.12;user=phone>
CSeq: 8 INVITE
Call-ID: e6828be1-1cdd-4fb0-bdda-cra7faf47df4
VIA: SIP/2.0/TLS 194.168.0.244:57918;branch=z9hU4bK828b7ad7
CONTACT: <sip:voip_911_user1@contapa.com;opaque=user:epid:R5bCFaUj51a06PUbkraS0QAA;gruu>;text;audio;video;image
PRIORITY: emergency
Supported: geolocation
CONTENT-TYPE: multipart/mixed; boundary=-------=_NextPart_000_4A7D_02CAB3D6.7519F890
geolocation: <cid:sip:voip_911_user1@contapa.com>;inserted-by="sip:voip_911_user1@contapa.com"

114

Message Body 112

• • •

List of Header Fields 316

From
To      } 118
Call-ID

FIG. 3

HANDLING SIP MESSAGES WITH MALFORMED HEADER FIELDS

BACKGROUND

The Internet Protocol Multimedia Subsystem (IMS) core is an architectural framework defined by the 3rd generation partnership project (3GPP) for delivering Internet Protocol (IP) multimedia to user equipment (UE). Both UEs and the nodes of the IMS core are configured to use a signaling protocol called Session Initiation Protocol (SIP) to establish, modify, and terminate multimedia sessions. A SIP message includes a Request/Status line, a message header and a message body. The message header is structured as a sequence of header fields to convey information about the SIP message.

Existing IMS nodes are configured to validate every header field in the message header of an incoming SIP message to determine whether each header field is malformed (e.g., by determining whether the syntax of the header field is valid or invalid, as defined by the relevant standard). If any header field in the message header is malformed, the SIP stack on the IMS node is configured to reject the SIP message (e.g., by generating a 4xx error code). It has been observed that some handsets generate malformed header fields in SIP messages after the handsets have been upgraded to a new version of an operating system (OS), which is causing sessions (e.g., call sessions) involving such handsets to fail. However, many of these call failures are unnecessary due to the fact that sessions can still be established even when certain header fields are malformed. A call failure can be detrimental in an emergency scenario, such as when a user is trying to connect to a 911 operator but the user's emergency call is dropped due to a malformed header field in a SIP message.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIG. 1A shows a scenario where the communication device identifies header fields in the message header that match header fields in a list of header fields, and determines that the identified header fields are not malformed.

FIG. 2 illustrates a proxy call session control function (P-CSCF) node that his configured to handle SIP messages with malformed header fields.

FIG. 3 illustrates a portion of an example SIP message, and an example list of header fields that can be utilized for handling SIP messages with malformed header fields, according to various embodiments.

DETAILED DESCRIPTION

Figure 1A:
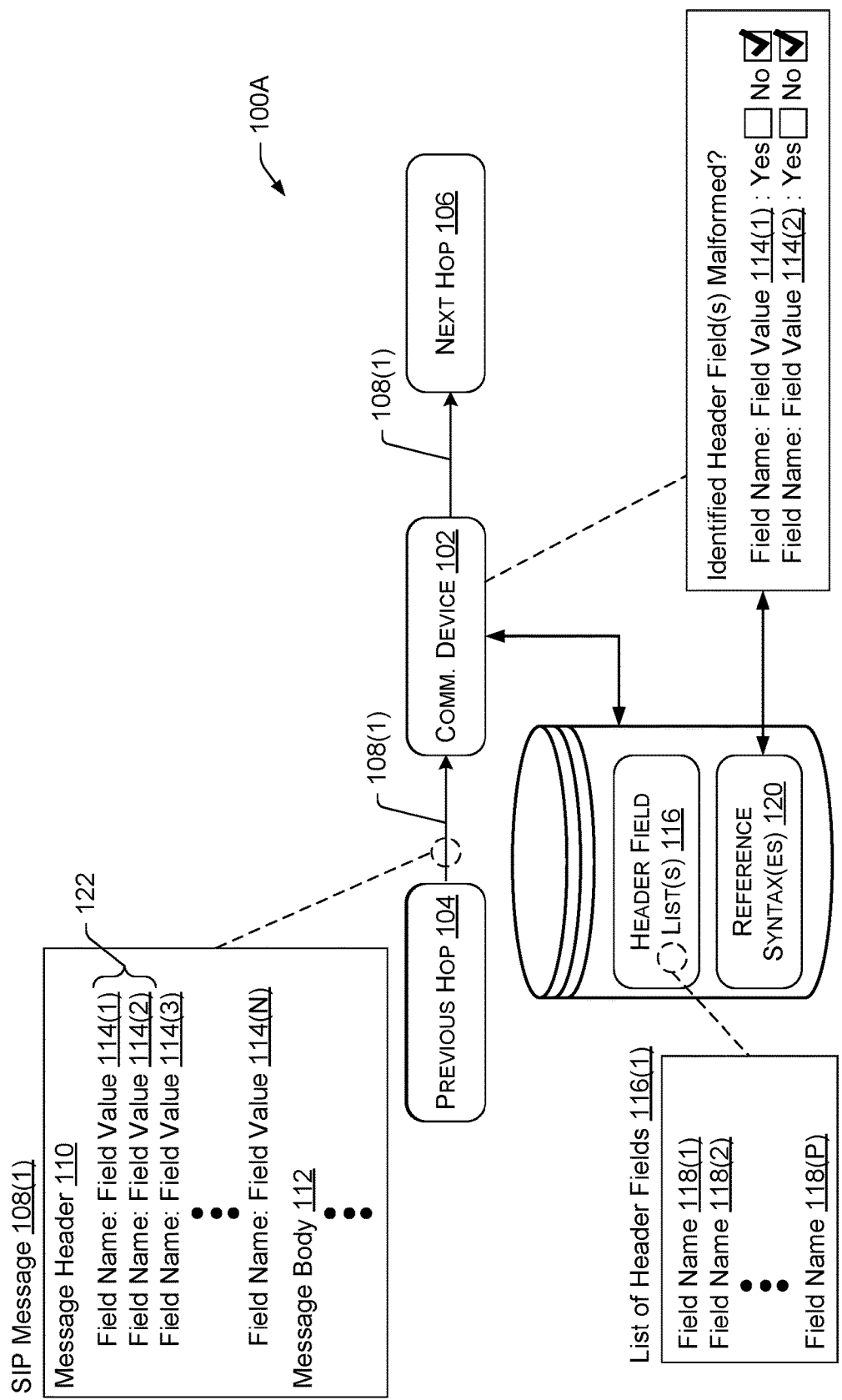
FIG. 1A is a schematic diagram illustrating a portion of a network including a communication device configured to handle SIP messages with malformed header fields.

Described herein are techniques, devices, and systems for handling Session Initiation Protocol (SIP) messages with malformed header fields. In some embodiments, a communication device that is configured to process SIP messages may have access to a list of SIP header fields that are to be checked before processing an incoming SIP message. In an illustrative example, the list of header fields accessible to the communication device may include a first field name (e.g., a From field name) of a first header field, a second field name (e.g., a To field name) of a second header field, and a third field name (e.g., a Call-ID field name) of a third header field. This list of header fields may be accessible to the communication device by virtue of being stored in local memory of the communication device, or in any other readily-accessible storage location remote from the communication device.

The communication device, with access to the list of header fields, may identify one or more header fields in the message header of an incoming SIP message that match header fields in the list. If any of the identified header fields are malformed, the communication device can reject the SIP message. If, however, none of the identified header fields are malformed, then the SIP message can be processed, such as by forwarding the SIP message to a downstream communication device. In this manner, the communication device does not waste resources (e.g., processing resources, etc.) validating header fields in the message header of the SIP message that do not appear in the list, seeing as how the SIP message can still be processed even in instances when those "off-list" header fields are malformed.

Although the techniques described herein can be implemented in non-IMS devices and associated networks that use SIP protocol as a signaling protocol, the techniques described herein are often described as being implemented by an Internet Protocol Multimedia Subsystem (IMS) node(s) of an IMS network. The IMS network includes various types of nodes. A plurality of IMS nodes may be interposed between a user equipment (UE) and a terminating endpoint, such as a public safety answering point (PSAP), along a pathway of network "hops" that is usable for establishing a communication session (e.g., an emergency call). Accordingly, when the techniques and systems are implemented on one or more IMS nodes, the result is an improved call experience because any negative impact that malformed header fields might have on the establishment of a communication session is mitigated, if not eliminated, by the disclosed techniques and systems. Lower call failure rates in emergency call scenarios can be a life-saving improvement in a telecommunication network because fewer emergency calls will be dropped.

An example process to be implemented by a communication device that is configured to process SIP messages can include receiving, by the communication device, from an additional communication device, a SIP message that includes a plurality of first header fields in a message header of the SIP message. The communication device may identify one or more identified header fields of the plurality of first header fields that correspond to (e.g., match) one or more second header fields in a list of second header fields accessible to the communication device, and the communication device may determine whether any of the one or more identified header fields are malformed without analyzing remaining header fields of the plurality of first header fields to determine whether the remaining header fields are malformed. If the communication device determines that the one or more identified header fields are not malformed, the communication device may process the SIP message. If the communication device determines that at least one identified header field of the one or more identified header fields is malformed, the communication device may reject the SIP message.

Also disclosed herein are systems and devices comprising one or more processors and one or more memories, as well as non-transitory computer-readable media storing computer-executable instructions that, when executed, by one or more processors perform various acts and/or processes disclosed herein.

The techniques and systems described herein allow for mitigating the adverse impact that malformed header fields have on communication sessions, such as calls. In emergency call scenarios, the ability of IMS nodes to handle SIP messages with malformed header fields can reduce the occurrence of call failures, thereby improving the likelihood that a given emergency call will be successfully established with a PSAP. The end result is an improved session experience, as well as an improved likelihood of an emergency call being answered and emergency response services being provisioned to people in need of assistance. It is to be appreciated that the techniques and systems are also applicable to "normal" (i.e., non-emergency) communication sessions, which can provide an improved call experience. In either case (i.e., emergency or non-emergency), improved network reliability translates to an improved call experience.

FIG. 1A is a schematic diagram illustrating a portion of a network 100A including a communication device 102 configured to handle SIP messages with malformed header fields. The network 100A may represent any type of SIP-based network that is configured to handle/process SIP signaling packets or messages. One example type of network that is configured to handle/process SIP signaling packets or messages is an IMS network. It is to be appreciated, however, that the network 100A may represent other non-IMS types of networks that use SIP as a signaling protocol and/or a voice over IP (VoIP) protocol.

The network 100A may enable peer-to-peer, client-to-client, and/or client-to-server, communications over Aired and/or wireless networks using any suitable wireless communications/data technology, protocol, or standard, such as Global System for Mobile Communications (GSM), Time Division Multiple Access (TDMA), Universal Mobile Telecommunications System (UNITS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology, including 5th Generation (5G) New Radio (NR) network protocols, and/or legacy network technology, such as 2G, 3G, 4G, including circuit-switched networking protocols and/or packet-switched networking protocols.

The communication device 102 may be implemented as any suitable type of device configured to communicate using any of the wireless communications/data technologies, protocols, or standards mentioned herein. For simplicity, FIG. 1A illustrates both a previous hop 104 relative to the communication device 102 and a next (or subsequent) hop 106 relative to the communication device 102. The previous hop 104 and the next hop 106 may also be implemented as any suitable type of device configured to communicate using any of the wireless communications/data technologies, protocols, or standards mentioned herein.

In FIG. 1A, the communication device 102 is shown as receiving a SIP message 108(1) from the previous hop 104 (e.g., an additional communication device). Session Initiation Protocol (SIP) is a signaling protocol that can be used to establish, modify, and terminate multimedia sessions (e.g., a multimedia telephony call, an emergency call, etc.) over packet networks. In an IMS implementation, a "SIP request" is a message that is sent from a UE to the IMS core using SIP protocol, and a "SIP response" is a message that is sent from the IMS core to a UE using SIP protocol. SIP may be used to authenticate access to IMS-based services. Accordingly, the previous hop 104 might represent a user equipment (UE) (e.g., a handset), or an upstream IMS node (e.g., a proxy call session control function (P-CSCF) node). In any case, the SIP message 108(1) includes a message header 110 and a message body 112. The message header 110 conveys information about the message, and it may be structured as a sequence of header fields 114(1), 114(2), 114(3), . . . , 114(N), where "N" is any suitable number. A given header field 114 may be specified as "Header: field", where "Header" is represents the header field name (or, simply "field name"), and "field" represents the field value. Hence, FIG. 1A depicts a given header field 114 as "Field Name", followed by a colon (":"), followed by "Field Value" (i.e., field name: field value). The field name of the header field 114 is intended to be the same across all SIP messages 108, while the field value may include a set of one or more tokens that are specific to an individual SIP message 108.

The communication device 102 of FIG. 1A may have access to one or more lists 116 of header fields (or, "header field list(s) 116"). An example list 116(1) of header fields is shown in FIG. 1A. Notably, the list 116(1) includes a set of field names 118(1), 118(2), . . . 118(P) of different types of header fields, where "P" is any suitable number. The list 116(1) may exclude field values for those header fields because the field names 118 are sufficient for identifying matching field names of header fields 114 within the message header 110 of an incoming SIP message 108(1).

The list(s) 116 of header fields may be stored at any suitable storage location that is readily-accessible to the communication device 102. "Readily-accessible", as used herein, means accessible at or below a threshold read access speed that is suitable for real-time processing of SIP messages 108. In one example, the list(s) 116 of header fields may be stored is local memory of the communication device 102 (e.g., a hard disk drive of the communication device 102). During operation, the communication device 102 may load a list(s) 116 into working memory and may cache entries in the list 116 for quicker access to the list 116 while processing SIP messages 108. In another example, the list(s) 116 of header fields may be stored at a centralized storage server communicatively coupled to the communication device 102 so that the communication device 102 may access the list(s) 116 on-demand.

The communication device 102 of FIG. 1A is also shown as having access to one or more reference syntaxes 120. The references syntax(es) 120 may adhere to a relevant Request for Comments (RFC) that defines the syntax(es) for the header field(s) in a given list 116. For example, the reference syntaxes 120 may specify valid syntaxes for field names and/or field values of various types of header fields including, without limitations, a From header field, a To header field, and/or a Call-ID header field. The reference syntax(es) 120 can be referenced to determine whether a header field 114 in the message header 110 of an incoming SIP message 108(1) is malformed. The reference syntax(es) 120 may also be stored at any suitable storage location that is readily-accessible (e.g., accessible at or below a threshold read access speed) to the communication device 102, as described herein.

Upon receiving a SIP message 108(1) from the previous hop 104, the communication device 102 may identify one or more identified header fields 122 of the plurality of first header fields 114(1)-(N) that correspond to (e.g., match) one or more second header fields in a list 116 of second header fields. Identifying an identified header field 122 that corresponds to (e.g., matches) a second header field in a list 116 may include comparing the field name of a first header field 114 in the SIP message 108(1) to the field names 118 in the list 116 of header fields, or vice versa, to determine if there is a match. Matching field names may have the same sequence of text characters, but may not be case-sensitive. In some embodiments, matching field names may be variants of one another as long as a similarity threshold is satisfied (e.g., an above-threshold number of matching text characters in the same sequence).

As shown in FIG. 1A, the identified header fields 122 include the first header field 114(1) and the second header field 114(2). This means that the communication device 102 determined that the field name of the first header field 114(1) matches a field name (e.g., the field name 118(1)) in the list 116(1), and that the field name of the second header field 114(2) matches another field name (e.g., the field name 118(2)) in the list 116(1). By comparing the header fields 114 in the message header 110 with the header fields in the list 116, the communication device 102 is able to categorize the header fields 114 in the message header 110 into a first group comprised of identified header fields 122 that are to be checked for malformation, and a second group comprised of remaining header fields that are not to be checked for malformation. In the example of FIG. 1A, the remaining header fields—which are not to be checked for malformation—include the header fields 114(3)-(N) within the message header 110.

After identifying the identified header fields 122, the communication device 102 may then analyze the identified header field(s) 122 to determine whether any of the identified header field(s) 122 are malformed. The communication device 102 may analyze the identified header field(s) 122 without analyzing (e.g., by refraining from analyzing) the remaining header fields of the plurality of first header fields 114 to determine whether the remaining header fields are malformed. In other words, the communication device 102 may ignore the remaining header fields other than the identified header field(s) 122 in the sense that the device 102 is not concerned with determining whether the remaining header fields are malformed. In the example of FIG. 1A, this means that the communication device 102 does not analyze the header fields 114(3)-(N) for malformation. In this manner, the communication device 102 does not waste resources (e.g., processing resources, etc.) validating the header fields 114(3)-(N), seeing as how the header fields 114(3)-(N) do not need to be validated (for malformation) in order to process the SIP message 108(1).

FIG. 1A shows a scenario where the communication device 102 determines that the identified header fields 122 are not malformed. For example, the communication device 102 may analyze the header field 114(1) to determine a syntax of the header field 114(1) (e.g., a syntax of the field name and/or a syntax of the field value), and may compare the syntax of the header field 114(1) to a corresponding reference syntax 120. Likewise, the communication device 102 may analyze the header field 114(2) to determine a syntax of the header field 114(2) (e.g., a syntax of the field name and/or a syntax of the field value), and may compare the syntax of the header field 114(2) to a corresponding reference syntax 120. The reference syntaxes 120 may be catalogued according to the type of header field so that the device 102 can look up the corresponding reference syntax 120 by type of header field.

In the example scenario of FIG. 1A, the syntaxes of the identified header fields 122 happen match the corresponding reference syntaxes 120, and, as a result, the communication device 102 determines that the identified header fields 122 are not malformed. Based on this determination, the communication device 102 may process the SIP message 108(1), such as by sending (e.g., forwarding) the SIP message 108 to the next hop 106 in the network 100A In the IMS implementation, the next hop 104 might represent a downstream IMS node (e.g., an emergency CSCF (E-CSCF) node, a breakout gateway control function (BGCF) node, etc.), or the next hop 104 might represent a PSAP, or any other suitable terminating endpoint. Notably, one or more of the remaining header fields 114(3)-(N) of the plurality of first header fields 114 may be malformed, yet the SIP message 108(1) can still be processed (e.g., forwarded) notwithstanding this malformation. By contrast, existing IMS nodes may reject the SIP message 108(1) if any of the remaining header fields 114(3)-(N) were malformed, thereby causing a session failure (e.g., a call failure). The techniques and systems described herein advantageously allow for processing SIP messages 108(1) with certain header fields 114 being malformed; namely, with malformed header fields that do not appear in a relevant list 116 of header fields.

Figure 1B:
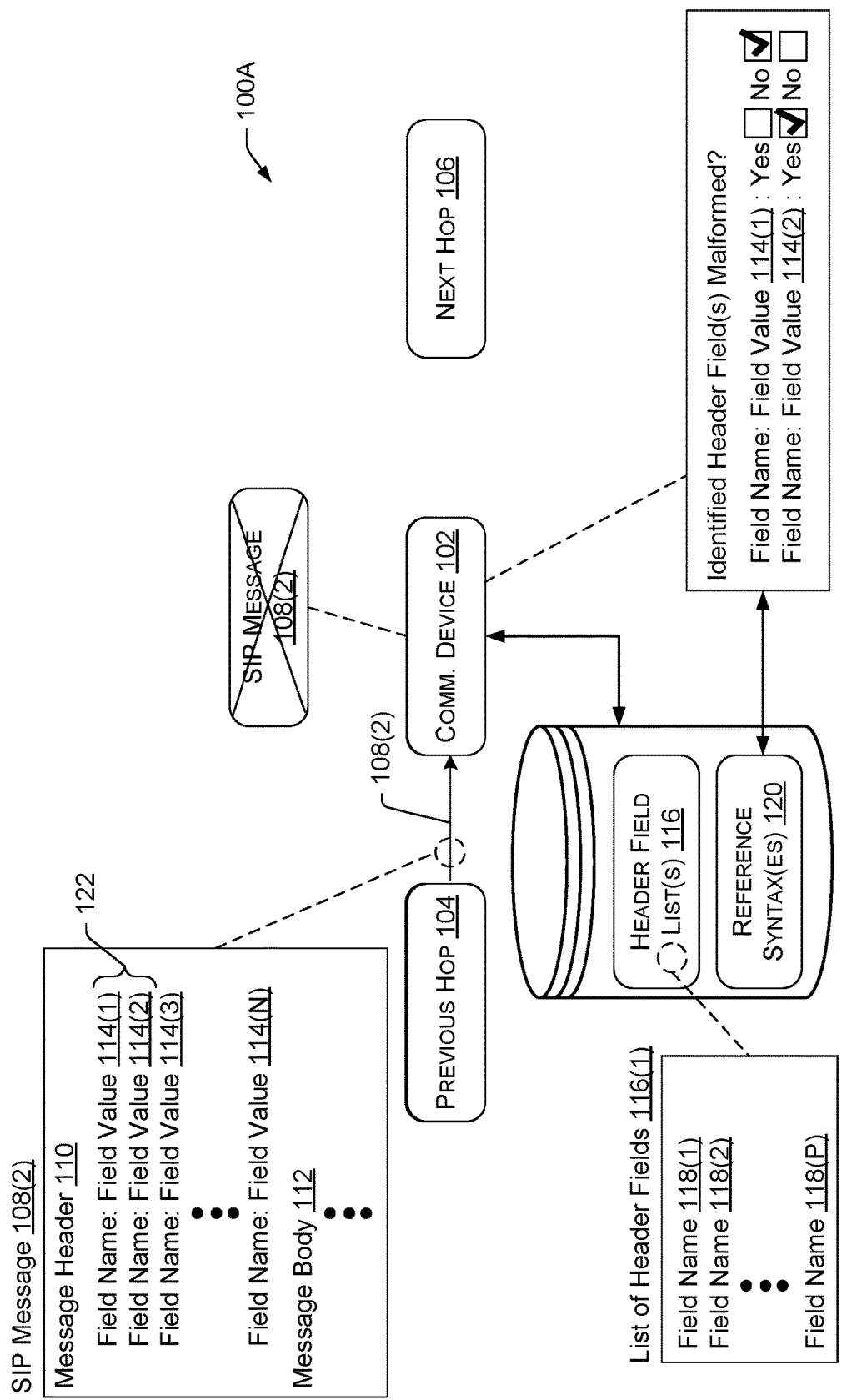
FIG. 1B is a schematic diagram illustrating the portion of the network shown in FIG. 1A, except that FIG. 1B shows a scenario where the communication device determines that one of the identified header fields is malformed.

FIG. 1B is a schematic diagram illustrating the portion of the network 100A shown in FIG. 1A, except in a scenario where the communication device 102 determines that one of the identified header fields 122 is malformed. For example, FIG. 1B shows the communication device 102 receiving a second SIP message 108(2). Consider that the SIP message 108(2) includes the same sequence of header fields 114(1)-

(N) as the SIP message 108(1) of FIG. 1A, except that one of the identified header fields 122—in this case, the header field 114(2)—is malformed. For example, the communication device 102 may analyze the header field 114(2) of the SIP message 108(2) to determine a syntax of the header field 114(2) (e.g., a syntax of the field name and/or a syntax of the field value), and may compare the syntax of the header field 114(2) to a corresponding reference syntax 120, and, based on this comparison, the communication device 102 may determine that the syntax of the second header field 114(2) does not match the corresponding reference syntax 120 for that header field 114(2). As a result, as shown in FIG. 1B, the communication device 102 determines that the second header field 114(2) (i.e., one of the identified header fields 122) is malformed. Based on this determination, the communication device 102 may reject the SIP message 108(2). In some embodiments, the communication device 102 may reject the SIP message 108(2) by refraining from forwarding the SIP message 108(2) to the next hop 106. In some embodiments, a notification of the rejection may be sent from the communication device 102 to the previous hop 104 to inform the previous hop 104 that the SIP message 108(2) has been rejected. For example, the communication device 102, upon determining that one of the identified header fields 122 is malformed, may send a 4xx error code (e.g., a Bad Request error code) to the previous hop 104. Accordingly, the communication device 102, despite being configured to process SIP messages 108 with certain header fields being malformed, may nevertheless reject SIP messages 108 if the malformed header fields correspond to those header fields that appear in the relevant list 116 of header fields.

Figure 2:
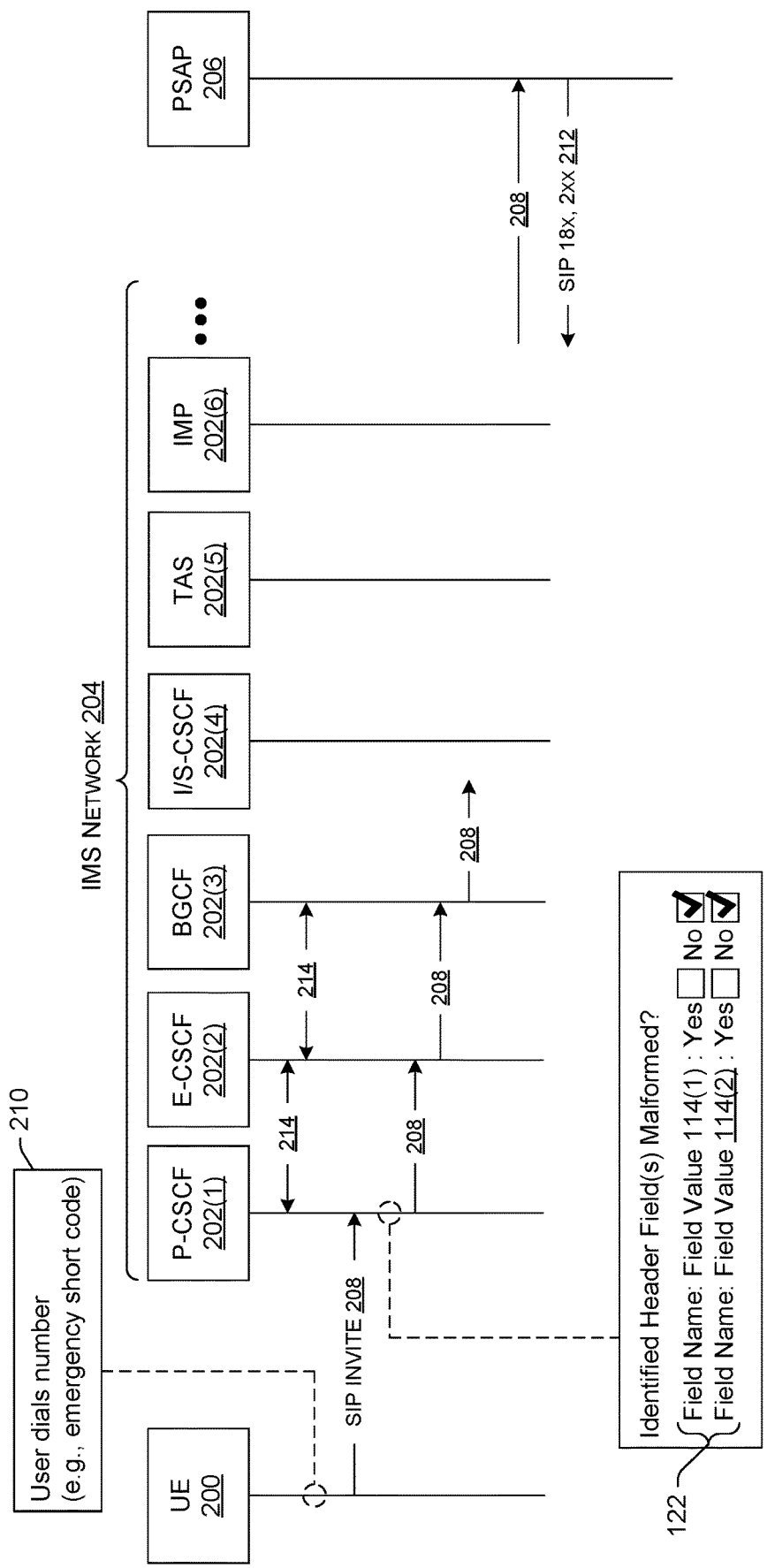
FIG. 2 is a schematic diagram illustrating example signaling between a UE, example nodes of an IMS network, and a public safety answering point (PSAP), according to various embodiments.

FIG. 2 is a schematic diagram illustrating example signaling between a UE 200, example nodes 202 of an IMS network 204, and a public safety answering point (PSAP) 206, according to various embodiments. FIG. 2 also illustrates a proxy call session control function (P-CSCF) node 202(1) that is configured to handle SIP messages with malformed header fields. It is to be appreciated that the "nodes" depicted in FIG. 2 may represent multiple nodes or a single node. It is also to be appreciated that additional IMS nodes may be utilized even though they are not depicted in FIG. 2.

The UE 200 may be implemented as any suitable type of computing device configured to communicate over a wireless network, including, without limitation, a mobile phone (e.g., a smart phone/handset), a tablet computer, a laptop computer, a portable digital assistant (PDA), a wearable computer (e.g., electronic/smart glasses, a smart watch, fitness trackers, head-mounted display (HMD), etc.), an in-vehicle (e.g., in-car) computer, and/or any similar mobile device, as well as situated computing devices including, without limitation, a television (smart television), set-top-box (STB), desktop computer, and the like. In accordance with various embodiments described herein, the terms "user equipment (UE)," "wireless communication device," "wireless device," "communication device," "mobile device," "client device," and "device" may be used interchangeably herein to describe any UE (e.g., the UE 200).

In general, a user can utilize the UE 200 to communicate with other computing devices of a telecommunications network via the IMS network 204. The IMS network 204 is sometimes referred to herein as "IMS core network," "IMS core," "Core Network (CN)," or "IM CN Subsystem". The IMS network 204 is an architectural framework defined by the 3GPP for delivering IP multimedia to a UE, such as the UE 200. The IMS network 204 can be maintained and/or operated by one or more service providers, such as one or more wireless carriers (or "operators"), that provide IMS-based services to users (sometimes called "subscribers") who are associated with UEs, such as the UE 200. For example, a service provider may offer multimedia telephony services that allow a subscribed user to call or message other users via an IMS network 204 using his/her UE. A user can also utilize an associated UE to receive, provide, or otherwise interact with various different IMS-based services by accessing computing devices of the IMS network 204. In this manner, an operator of an IMS network 204 may offer any type of IMS-based service, such as, telephony services, emergency services (e.g., E911), gaming services, instant messaging services, presence services, video conferencing services, social networking and sharing services, location-based services, push-to-talk services, real-time text (RTT) services, and so on. In order to access these services (e.g., emergency services), a UE is configured to request establishment of a communication session. In the case of emergency services, the communication session can comprise a call (i.e., a voice-based communication session, such as a E911 call).

The UE 200 is configured to utilize various access networks, including radio access networks (RANs) and/or radio access technologies (RATs), in order to access the IMS network 204. UEs that are fifth generation (5G) New Radio (NR)-compliant may be configured to communicate with heterogeneous cellular networks by employing radios that can communicate over 5G systems (or "5G networks") as well as over legacy or predecessor systems (or "legacy networks") relative to 5G systems. Similarly, UEs that are fourth generation (4G) LTE-compliant may be configured to communicate within heterogeneous cellular networks by employing radios that can communicate over LTE systems (or "LTE networks") as well as over legacy or predecessor systems (or "legacy networks") relative to 4G systems. Today's legacy networks, such as third generation (3G), and second generation (2G) networks, may employ circuit-switching for voice communications, while 5G and 4G LTE networks employ packet-switching for both data and voice communications in an all-IP data transport technology. In general, 4G LTE-compliant and 5G New Radio (NR)-compliant UEs are configured to prefer attachment to corresponding networks, which offer relatively high data-rate throughput as compared to available legacy or predecessor networks. In most UEs, a choice of which protocol to employ depends primarily on what networks are available to the UE at the UE's present geographic location. Furthermore, in instances where the preferred network (e.g., 4G, 5G, etc.) is unavailable or unusable for any reason, legacy networks, if available, may be used as a failback protocol, such as by using a circuit-switch fallback (CSFB) mechanism. The UE 200 of FIG. 2 can comprise a UE with such capabilities to allow for communication over any type of telecommunications network.

Initially, the UE 200 may perform an attach procedure in order to attach to a telecommunications network. In instances where a legacy network is available to the UE 200, the UE 200 can utilize a "combined attach" procedure where the UE 200 sends an attachment request by performing registration for services via both a legacy (e.g., circuit-switched) network and a preferred (e.g., packet-switched) network, such as 5G NR or 4G LTE. If successful in the combined attached registration procedure, the result of the attachment request is one where the UE 200 is "combined attached," and the UE 200 can thereafter implement fallback procedures to reattempt establishment of a communication session via a legacy network in the event that a communication session (e.g., an emergency call) fails, on a preferred network or cannot be provided with sufficient Quality of Service (QoS) (i.e., below a QoS threshold) on the preferred network. If unsuccessful in the combined attach request, or if there is only a single network available (e.g., the UE is at a geographic location within a 5G NR-only coverage area, a 4G LTE-only coverage area, or within another legacy network-only coverage area, etc.), a different result of the attachment request may be one where the UE 200 is not combined attached, and is therefore attached to a single network. In either case, an attached UE that has completed the relevant attach procedure will have established a radio link in order to transmit data to, and receive data from, nodes in the telecommunications network, such as the IMS network 204.

Before attempting to setup and establish a communication session, the UE 200 may request registration for one or more IMS-based services provided via the IMS network 204. Registration of the UE 200 can involve identifying a P-CSCF node, such as the P-CSCF node 202(1), and sending a registration request via a RAN to an address of the P-CSCF node 202(1). To register for emergency services, the registration request may include an emergency packet data network (E-PDN) request and an emergency registration (E-Registration or E-REG) request. SIP may be used by the UE 200 for transmitting messages to/from the IMS network 204. Accordingly, during an attach procedure, the UE 200 may send a registration request in the form of a SIP message using the SIP REGISTER method as part of the initial procedures for establishing a multimedia communication session.

As shown in FIG. 2, after the UE 200 is attached to a telecommunications network, a user of the UE 200 can initiate a communication session, such as an emergency call. To accomplish this, the user can dial a number, as shown by reference numeral 210 in FIG. 2. In an emergency scenario, the dialed number can be an emergency short code (e.g., 911 in the United States) that is used for connecting the user to a local PSAP 206. The user action at 210, which is received by the UE 200 as input (e.g., user input), causes the UE 200 to perform initial setup procedures in an attempt to setup and establish a communication session, such as an emergency call. It is to be appreciated that the user can dial a number in any suitable fashion, such as by selecting an existing contact (e.g., a stored phone number), by dialing a phone number on a keypad (e.g., a soft keypad presented on a touch screen, or a physical keypad of the UE 200 having depressible buttons, etc.), by speaking an utterance (e.g., "Call Nine One One") that is detected by a microphone of the UE 200 and understood by voice recognition software, and so on.

In the United States, the user can dial a 10 digit number to make a normal call to another user. 3 digit short codes are also available for a user to access various services, such as "911" for emergency services. In the case of a 3 digit emergency short code ("911" in the United States), the initial setup procedures performed by the UE 200 may include one or more setup procedures that are particular to the emergency type of communication session. For example, the originating UE 200 may send, as part of the initial setup procedures for a E911 call, an emergency packet data network (E-PDN) connection request to a mobility management entity (MME) (not shown in FIG. 2) of the IMS network 204. Such a request may be sent from the UE 200 using Non-Access Stratum (NAS) protocol, which is used to convey non-radio signaling between a UE, such as the UE 200, and the MME for LTE/E-UTRAN access. Continuing with the emergency call example, the UE 200 may receive a response (e.g., an E-PDN connected response) from the MME to indicate that the UE 200 is connected to the E-PDN. The UE 200 may also send an emergency registration (E-REG) request as part of the initial setup procedures, and may receive a response to the E-REG request indicating a successful emergency registration.

FIG. 2 illustrates that the UE 200 may send a SIP request 208 (i.e., a SIP message 208) using the SIP INVITE method. This SIP request 208 may be sent from the UE 200 to the IMS network 204, and in particular, to a P-CSCF node 202(1). The SIP request 208(1) may represent request to establish a communication session with a terminating endpoint. In the case of an emergency call, the terminating endpoint may comprise a nearest PSAP 206. Again, it is to be appreciated that, although many of the examples herein are described in the context of an emergency communication sessions, the techniques and systems described herein are not limited to emergency communication sessions, as the techniques and systems are also applicable to a "normal" (i.e., non-emergency) communication session. In a "normal" communication session scenario of FIG. 2, any emergency-related setup procedures described herein may be omitted or replaced by commensurate non-emergency setup procedures. Nevertheless, the initial setup procedures for a normal (non-emergency) communication session, like the emergency communication session, may include sending the SIP request 208 (e.g., the SIP INVITE) from the UE 200 to the IMS network 204 (e.g., to a P-CSCF node 202(1)).

It is to be appreciated that the initial setup procedures can include various actions and message transmissions by and between the UE 200 and various network nodes in addition to the example actions and message transmission described herein, and that some or all of the example setup procedures described herein may be performed during session setup, depending on the implementation. In general, any suitable setup procedures known to a person having ordinary still in the art may be performed with the aim of establishing a communication session for the UE 200 over a telecommunications network. Because network topologies vary between service providing entities, the signaling employed during an attach procedures and the initial setup procedures may vary.

FIG. 2 depicts an example where the P-CSCF node 202(1) is configured to implement the techniques described herein for handling SIP messages with malformed header fields. For instance, upon receiving a SIP request 208 from the UE 200, the P-CSCF node 202(1) may identify one or more identified header fields 122 in the message header 110 of the SIP request 208 that correspond to (e.g., match) header fields in a list 116 of header fields that is accessible to the P-CSCF node 202(1), as described in detail above with reference to FIGS. 1A and 1B. In the example of FIG. 2, the identified header fields 122 include a first header field 114(1) and a second header field 114(2). The P-CSCF node 202(1) may then analyze the identified header field(s) 122 to determine whether any of the identified header field(s) 122 are malformed. FIG. 2 shows a scenario where the P-CSCF node 202(1) determines that the identified header fields 122 are not malformed. For example, the P-CSCF node 202(1) may analyze the header field 114(1) to determine a syntax of the header field 114(1) (e.g., a syntax of the field name and/or a syntax of the field value), and may compare the syntax of the header field 114(1) to a corresponding reference syntax 120. Likewise, the P-CSCF node 202(1) may analyze the header field 114(2) to determine a syntax of the header field 114(2)(e.g., a syntax of the field name and/or a syntax of the field value), and may compare the syntax of the header field 114(2) to a corresponding reference syntax 120. In the example of FIG. 2, the syntaxes of the identified header fields 122 happen to match the corresponding reference syntaxes 120, and, as a result, the P-CSCF node 202(1) determines that the identified header fields 122 are not malformed. Based on this determination, the P-CSCF node 202(1) may process the SIP request 208, such as by sending (e.g., forwarding) the SIP request 208 to the next hop in the IMS network 204, which, in the example of FIG. 2, may be an E-CSCF node 202(2).

In some embodiments, other IMS nodes 202 in the IMS network 204 may be configured to implement the same, or similar, logic as described with reference to the P-CSCF node 202(1). That is, the E-CSCF node 202(2) may, additionally or alternatively, be configured to identify one or more identified header fields 122 in a message header 110 of an incoming SIP request 208, to analyze the identified header field(s) 122 to determine whether any of the identified header field(s) 122 is/are malformed (without analyzing remaining header fields in the message header 110), and, assuming none of the identified header field(s) 122 is/are malformed, to process the SIP request 208, such as by forwarding the SIP request 208 to the next hop 106 in the IMS network 204. Accordingly, any, or all, of the IMS nodes 202 can implement the techniques described herein for handling SIP messages with malformed header fields. In some embodiments, to conserve resources (e.g., processing resources, etc.), downstream nodes that are downstream relative to an IMS node 202 that analyzes identified header fields 122 for malformation may refrain from doing the same (i.e., analyzing the identified header fields 122) so for a second time. Instead, the downstream nodes may defer to the upstream node's determination that the identified header fields 122 in the message header 110 of a given SIP message 208 are not malformed.

Eventually, the SIP request 208 may be received by the PSAP 206, and a SIP response 212, such as 18x SIP response, a 2xx SIP response, may be sent from the PSAP 206 back through the relevant nodes 202 of the IMS network 204 along a return communication path to the destination UE 200. Here, the "x" in 18x and 2xx of the SIP response 212 may represent a variable that can be set to any suitable value corresponding to a valid SIP response 212 specified in the 3GPP standard. For instance, a 18x SIP response 212 may include, without limitation, 180 Ringing response, a 181 Call Being Forwarded response, a 182 Queued response, a 183 Session In Progress response, and a 2xx SIP response 212 may include, without limitation, any 2xx-successful (e.g., a 200 (OK) response indicating successful connection. If the UE 200 receives a 200 (OK) response 212, for example, one or more final setup procedures may be performed to establish the communication session with the PSAP 206 over the IMS network 204. Such final setup procedures can include various actions and message transmissions by and between the UE 200, the various network nodes 202, and the PSAP 206. It is to be appreciated that the setup procedures described herein are merely examples, and that some or all of these example setup procedures may be performed, along with additional setup procedures known to a person having ordinary skill in the art, during session setup, depending on the implementation.

Example setup procedures that may be performed to establish a communication session between the UE 200 and the PSAP 206 can include, without limitation, the UE 200 sending/receiving any SIP request/response to/from the IMS network 204, such as sending a SIP INVITE request 208, receiving a 100 Trying response, receiving a 180 Ringing response (indicating that a called party of the terminating UE or PSAP 206 is being alerted), receiving a 181 Call Being Forwarded response, receiving a 182 Queued response, receiving a 183 Session In Progress response, receiving a SIP response that includes session description protocol (SDP) information (e.g., an SDP answer), receiving a SIP response that includes "early media" (e.g., user data), and/or receiving a final response to resolve the setup of the communication session. Such a final SIP response can be in the form of a 2xx-successful (e.g., a 200 (OK) response indicating successful connection), 3xx-redirection, 4xx-client failure, 5xx-server failure, or 6xx-global failure, and so on. Since many of these setup procedures involve the transmission of SIP messages, the individual SIP messages transmitted from node-to-node may be processed according to the techniques described herein. In other words, although FIG. 2 depicts an example where the SIP message 208 is a SIP INVITE 208, other types of SIP messages can be processed in a similar manner to handle malformed header fields as described herein. Further examples of the setup procedures can include, without limitation, the UE 200 sending/receiving any NAS-based request/response to/from an MME, such as sending/receiving a radio resource control (RRC) connection request/response to/from the MME, sending/receiving a RRC connection reconfiguration complete request/response to/from the MME, sending/receiving a request/response to/from the MME indicating that a dedicated EPS bearer has been established, and so on. Further examples of the setup procedures can include, without limitation, the UE 200 sending/receiving any type of UPDATE request/response, sending/receiving any type of "ACK" request/response (e.g., a PRACK message), and so on, to/from any suitable network node.

Setup procedures for a given communication session may vary by implementation, session type (e.g., phone call verses video conference, emergency verses non-emergency call, etc.), attachment result (e.g., combined attached verses not combined attached), network topology, and/or other factors. Accordingly, detailed and exhaustive examples of setup procedures and the order in which they are performed in order to setup a communication session are not described herein, as the various possible setup procedures are generally known to a person having ordinary skill in the art. As such, any given session setup may include some or all of the example setup procedures described herein, performed in a suitable order to establish a communication session, such as an emergency call. It is to be appreciated that a communication session is not successfully established unless and until the UE 200 receives a final SIP response in the form of a 2xx response.

FIG. 2 also illustrates how a pair(s) of nodes 202 in the IMS network 204 can exchange capability information 214 with each other. For example, the P-CSCF node 202(1) is shown as exchanging capability information 214 with a downstream, E-CSCF node 202(2), and the E-CSCF node 202(2) is shown as exchanging capability information 214 with a downstream, BGCF node 202(3). This exchange of capability information 214 may be performed by one or more additional nodes 202 as well, such as, without limitation, an interrogating-CSCF (I-CSCF) node/serving-CSCF (S-CSCF) node 202(4), a telephony application server (TAS) 202(5), and/or an interface message processor (IMP) node 202(6), among other nodes of the IMS network 204.

An example reason for exchanging capability information 214 between nodes is due to the fact that it may take some time to deploy logic for handling SIP messages with malformed header fields across a network of a large number of devices, including devices maintained and operated by different service providers. The exchange of capability information 214 between an upstream node 202 and a downstream node 202 may include the upstream node 202 sending its capability information 214 to the downstream node 202, and the downstream node 202 returning a response containing its capability information 214, or vice versa. Capability information 214 can be exchanged in SIP-based messaging or in non-SIP based messaging. In some embodiments, capability information 214 may be indicated in a message (e.g., in a message header) by setting a value (e.g., a binary value) to a first value (e.g., true) or a second value (e.g., false). This can indicate to the receiving node whether the sending node is configured to handle SIP messages with malformed header fields. In other words, if the P-CSCF node 202(1) receives capability information 214 from the E-CSCF node 202(2) indicating the E-CSCF node 202(2) is capable of, or otherwise supports, handling SIP messages with malformed header fields, the P-CSCF node 202(1) can determine, based at least in part on exchanging the capability information 214, that the downstream node (which is the E-CSCF node 202(2) in this example) will not reject SIP messages based on malformed header fields that do not appear in a predefined list 116 of header fields.

Capability information 214 may be exchanged between a given pair of nodes 202 at any suitable time. For example, capability information 214 can be exchanged during call setup, or during the mass processing of calls and associated SIP messages. Additionally, or alternatively, capability information 214 can be exchanged before receiving a SIP message 208, after receiving a SIP message 208 but before sending (e.g., forwarding) the SIP message 208 to the downstream node 202, or capability information 214 can be transmitted in the SIP message 208 itself (e.g., in the message header 110 of the SIP message 208). The exchange of capability information 214 is discussed in more detail below with reference to FIG. 5.

FIG. 3 illustrates a portion of an example SIP message 308, and an example list 316 of header fields that can be utilized for handling SIP messages with malformed header fields, according to various embodiments. The example SIP message 308 includes a message header 110 and a message body 112, as described herein. The message header 110 of the SIP message 308 is shown as including a sequence of header fields 114 including a From header field, a To header field, a CSeq header field, a Call-ID header field, a Via header field, a Contact header field, a Priority header field, a Supported header field, a Content-Type header field, and a Geolocation header field.

Meanwhile, the example list 316 of header fields that is accessible to a communication device 102 may include a set of field names 118 of different types of header fields, such as a From field name, a To field name, and a Call-ID field name. Accordingly, using the example of FIG. 3, a communication device 102 that is configured to implement the techniques described herein may identify, as identified header fields 122, the From header field, the To header field, and the Call-ID header field among the header fields 114 in the message header 110 of the SIP message 308. These particular header fields 114 are identified because the field names of the From header field, the To header field, and the Call-ID header field match the field names 118 in the list 316. Accordingly, the communication device 102 may analyze the identified header fields 122 (e.g., the From header field, the To header field, and the Call-ID header field) within the message header 110 to determine their respective syntaxes (e.g., the syntax of the field name and/or the syntax of the field value), and the communication device 102 may compare the respective syntaxes to their corresponding reference syntaxes 120 to determine if any of the identified header fields 122 in the message header 110 of the SIP message 308 are malformed. Meanwhile, the communication device 102 refrains from analyzing (i.e., ignores) the remaining header fields 114 with field names that do not match any of the field names 118 of the header fields in the list 316. In this example, the communication device 102 ignores the remaining header fields 114, which include the CSeq header field, the Via header field, the Contact header field, the Priority header field, the Supported header field, the Content-Type header field, and the Geolocation header field. Any one of these remaining header fields 114 can be malformed and the communication device 102 will not reject the SIP message 308. This allows for establishing an emergency call notwithstanding malformed header fields 114 in the message header 110 of the SIP message 308, so long as the malformed header fields are not the From header field, the To header field, or the Call-ID header field that appear in the list 316.

Consider an example where a UE 200 generated a malformed Geolocation header field 114 in the message header 110 of the SIP message 308, and then sent the SIP message 308 to the IMS network 204 (e.g., to a P-CSCF node 202(1)). For example, the UE 200 might have generated a field value of the Geolocation header field 114 with an incorrect syntax that does not match a reference syntax 120 associated with the Geolocation header field. If the P-CSCF node 202(1) that receives the SIP message 308 has access to the list 316 of header fields and is configured to exclusively check the header fields 114 in the SIP message 308 that appear in the list 316 for malformation, the malformed Geolocation header field 114 will not cause the P-CSCF node 202(1) to reject the SIP message 308. For example, the P-CSCF node 202(1) may identify, as identified header fields 122, a subset of the header fields 114 in the message header 110 of the SIP message 308 that match the header fields in the list 316; namely, the P-CSCF node 202(1) may identify, as the identified header fields 122, the From header field, the To header field, and the Call-ID header field in the message header 110, and the P-CSCF node 202(1) may analyze the identified header fields 122 to determine whether any of the identified header fields 122 are malformed (e.g., by validating their syntaxes) without analyzing remaining header fields 114, including the Geolocation header field 114, in the message header 110 to determine whether the remaining header fields are malformed. In this particular example, the Geolocation header field 114 is one of the remaining header fields that does not appear in the list 316, so the P-CSCF node 202(1) refrains from determining whether the Geolocation header field 114 is malformed, and if the Geolocation header field 114 is indeed malformed, it has no negative impact on the processing of the SIP message 308. Assuming the identified header fields 122 (e.g., the From header field, the To header field, and the Call-ID header field) are not malformed, the P-CSCF node 202(1) may process the SIP message 308, such as by forwarding the SIP message 308 to a downstream IMS node (e.g., the E-CSCF node 202(2)).

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 4:
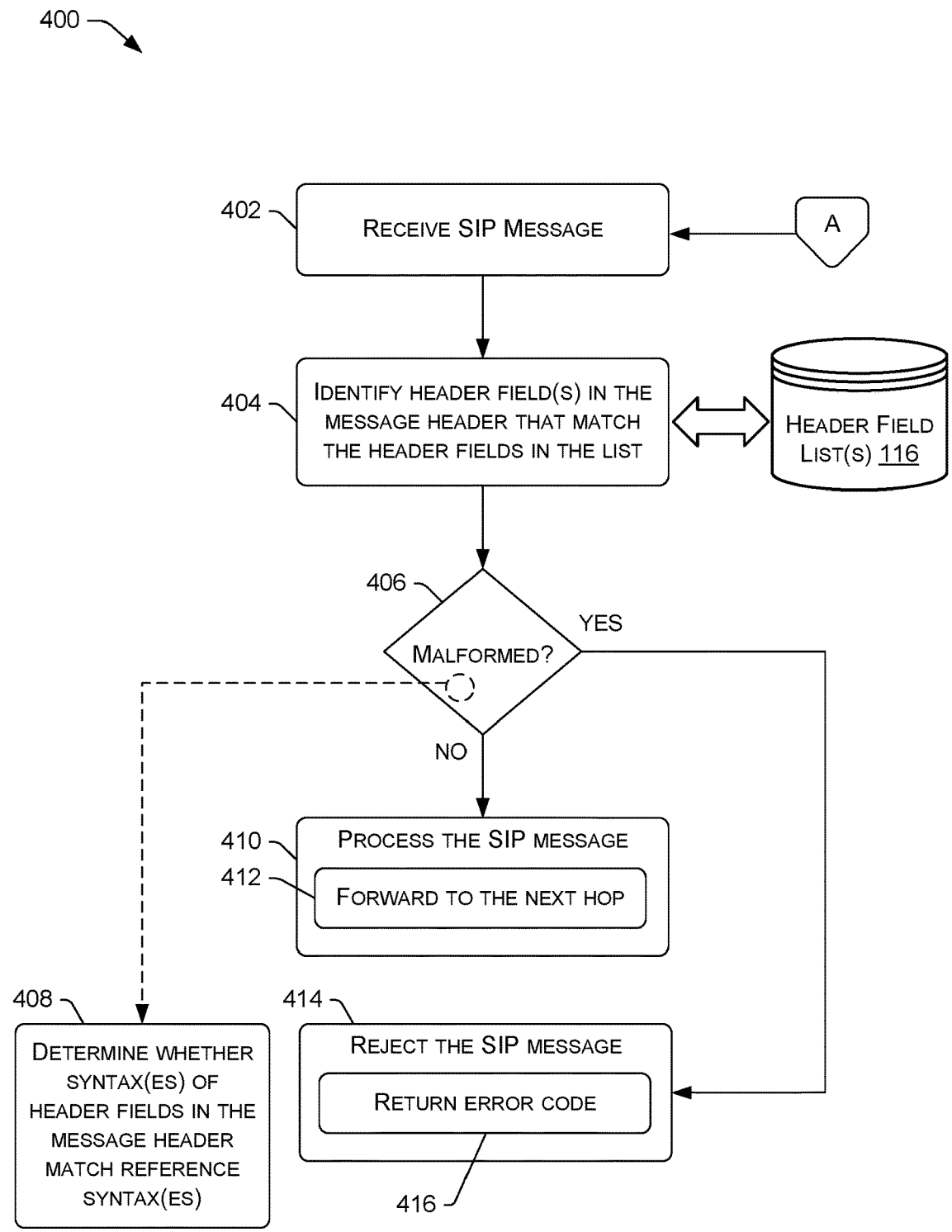
FIG. 4 illustrates a flowchart of an example process for handling an incoming SIP message at a communication device, according to various embodiments.

FIG. 4 illustrates a flowchart of an example process 400 for handling an incoming SIP message at a communication device, according to various embodiments. The process 400 is described with reference to the previous figures.

At 402, a communication device 102 may receive, from an additional communication device, a SIP message 108/208/308 that includes a plurality of first header fields 114 in a message header 110 of the SIP message 108/208/308. For example, the SIP message 108/208/308 may be a SIP request originating from a UE 200 that uses the SIP INVITE method to establish a communication session (e.g., an emergency call).

At 404, logic (e.g., a processor(s) executing computer-executable instructions) of the communication device 102 may identify, one or more identified header fields 122 of the plurality of first header fields that correspond to (e.g., match) one or more second header fields in a list 116/316 of second header fields. As shown pictorially in FIG. 4, the list 116 of second header fields may be accessible to the communication device 102, such as by being stored in local memory of the communication device 102, and/or at a remote storage location that is readily-accessible to the communication device 102. Identifying the identified header field(s) 122 at block 404 may include comparing one or more field names of the identified header field(s) 122 to field names 118 included in the list 116, or vice versa, to determine if there is a matching field name. For example, the logic of the communication device 102 may compare a first field name of a first identified header field 122 to the field names 118 in the available list 116 to determine if the first field name matches any of the field names 118 in the list 116.

At 406, the logic of the communication device 102 may analyze the one or more identified header fields 122 to determine whether any of the one or more identified header fields 122 are malformed without analyzing remaining header fields of the plurality of first header fields 114 to determine whether the remaining header fields are malformed. As shown by sub-block 408, the logic of the communication device 102 may determine that the one or more identified header fields 122 are not malformed, for an individual header field of the one or more identified header fields 122, by comparing a syntax(es) of the individual header field (e.g., a syntax of the field name and/or a syntax of the field value) to a corresponding reference syntax(es) 120, and by determining whether the syntax(es) matches the corresponding reference syntax(es) 120. This may be done for each identified header field 122 at block 406.

If, at block 406, the logic of the communication device 102 determines that the one or more identified header fields 122 are not malformed, the process 400 may follow the "NO" route from block 406 to block 410, where the communication device 102 may process the SIP message 108/208/308 based at least in part on determining that the one or more identified header fields 122 are not malformed. Again, the SIP message 108/208/308 may be processed without determining whether remaining header fields of the plurality of first header fields 114 within the message header 110 are malformed, which means that any or all of the remaining header fields can be malformed and the SIP message 108/208/308 is still processed at block 410. At sub-block 412, processing the SIP message 108/208/308 may include forwarding the SIP message 108/208/308 to a next hop 106 of a network 110A.

In an IMS implementation, the communication device 102 may be an IMS node 202 of an IMS network 204, and the communication device 102 may have received the SIP message 108/208/308 at block 402 from an additional (upstream) IMS node 202 or a UE 200. In this example, the next hp 106 to which the SIP message 108/208/308 may be forwarded at sub-block 412 may be yet another (downstream) IMS node 202 or a PSAP 206, such as when the SIP message 108/208/308 is associated with an emergency call.

Retuning to block 406, if the logic of the communication device 102 determines that at least one identified header field 122 of the one or more identified header fields 122 is malformed, the process 400 may follow the "YES" route from block 406 to block 414, where the logic of the communication device 102 may reject the SIP message 108/208/308 based at least in part on the determining that the at least one identified header field 122 is malformed. At sub-block 416, rejecting the SIP message 108/208/308 may include returning an error code (e.g., a 4xxerror code) to the previous hop 104 that sent the SIP message 108/208/308.

Figure 5:
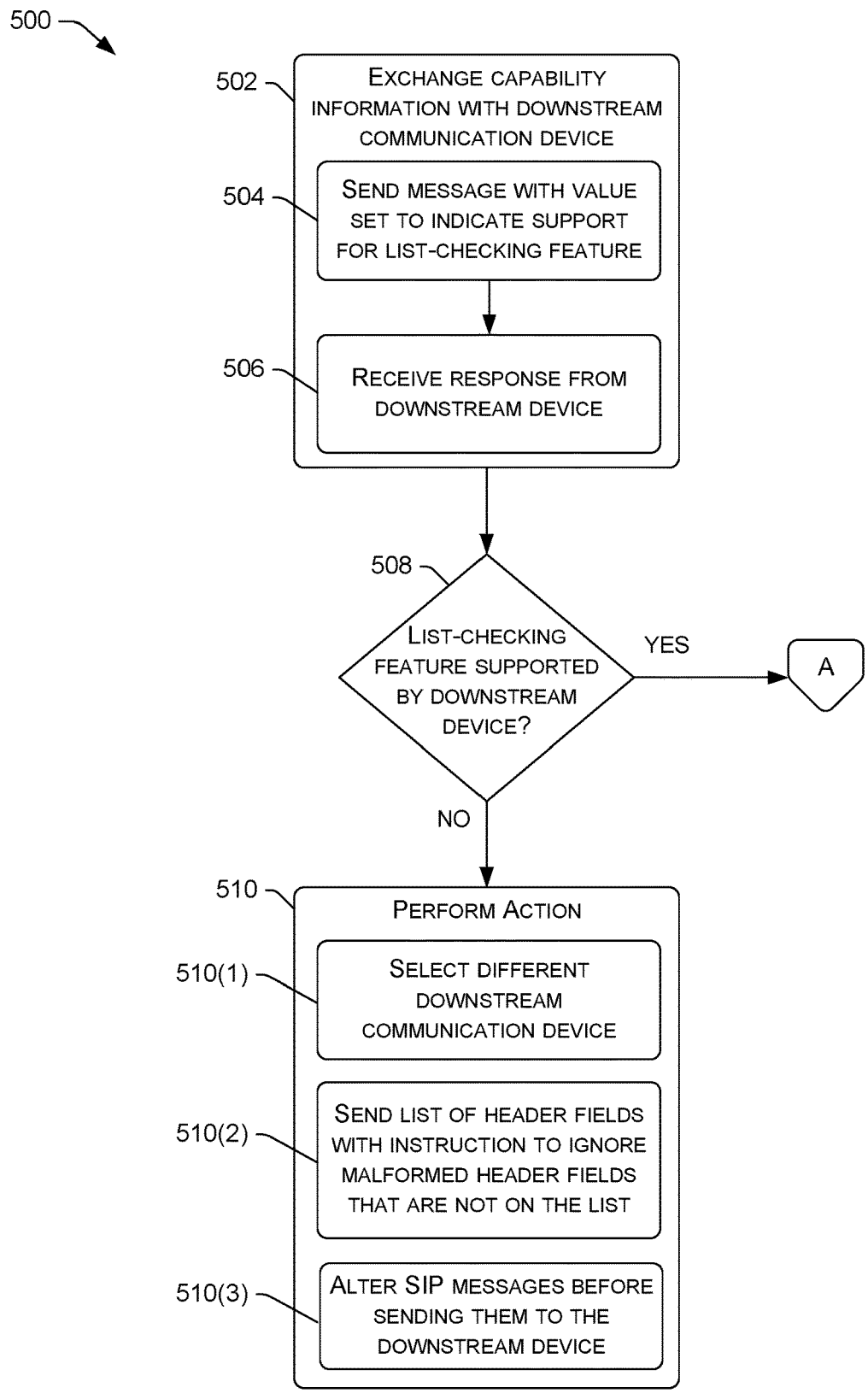
FIG. 5 illustrates a flowchart of an example process for exchanging capability information with a downstream communication device, according to various embodiments.

FIG. 5 illustrates a flowchart of an example process 500 for exchanging capability information 214 with a downstream communication device, according to various embodiments. The process 500 is described with reference to the previous figures.

At 502, a communication device 102 may exchange capability information 214 with the downstream communication device. Exchanging capability information at block 502 may include multiple sub-operations, as shown by sub-blocks 504 and 506.

At sub-block 504, the communication device 102 may send a message to the downstream communication device with a value set to indicate support for a list-checking feature. The "list-checking feature", in this context, may represent a capability for analyzing header fields in message headers 110 of SIP messages against a list 116 of header fields to check for malformation of the header fields that appear in the list 116, as described herein.

The value in the message sent at sub-block 504 may be any suitable value, such as a Boolean value that can be set to "True" or "False", "Yes" or "No", etc. One of the binary values may indicate support for the list-checking feature, while the other of the binary values may indicate a lack of support for the list-checking feature.

At sub-block 506, the communication device 102 may receive a response from the downstream device, the response including capability information 214 of the downstream communication device. For example, the response received at sub-block 506 may also have the value set according to whether the downstream device supports the list-checking feature or not.

At 508, logic (e.g., a processor(s) executing computer-executable instructions) of the communication device 102 may determine, based on the capability information 214 in the response received from the downstream device, whether the downstream device supports the list-checking feature. If the downstream device supports the list-checking feature, the process 500 may end, or, as shown in FIG. 5, the process 500 may follow the "YES" route from block 508 to block 402 of the process 400, as shown by the off-page reference "A" in FIGS. 4 and 5. That is, the communication device 102 may determine, based at least in part on exchanging the capability information 214, that the downstream communication device will not reject SIP messages 108/208/308 based on any remaining header fields other than identified header fields 122 being malformed. If both devices support the list-checking feature, the communication device 102 may wait to receive a SIP message 108/208/308 from an upstream device. If the downstream device does not support the list-checking feature, the process 500 may follow the "NO" route from block 508 to block 510, where the communication device 102 may perform an action. FIG. 5 depicts three example actions that may be performed by the communication device 102 at block 510 in response to determining that the downstream device lacks support for the list-checking feature.

At 510(1), the action performed by the communication device 102 may comprise selecting a different downstream communication device to which SIP messages 108/208/308 will be forwarded. For example, if the communication device 102 has the ability to select from multiple available downstream device of the same type (e.g., multiple E-CSCF nodes 202(2)), the communication device 102 may prefer to send SIP messages 108/208/308 to a downstream device that supports the list-checking feature in lieu of sending SIP messages 108/208/308 to the downstream device that lacks support for the list-checking feature.

At 510(2), the action performed by the communication device 102 may comprise sending the list 116 of header fields accessible to the communication device 102 to the downstream device along with an instruction to ignore malformed header fields that are not included in the list 116.

At 510(3), the action performed by the communication device may comprise altering any SIP messages 108/208/308 that happen to include malformed header fields that do not appear on the list 116 before sending the SIP messages 108/208/308 to the downstream device.

Figure 6:
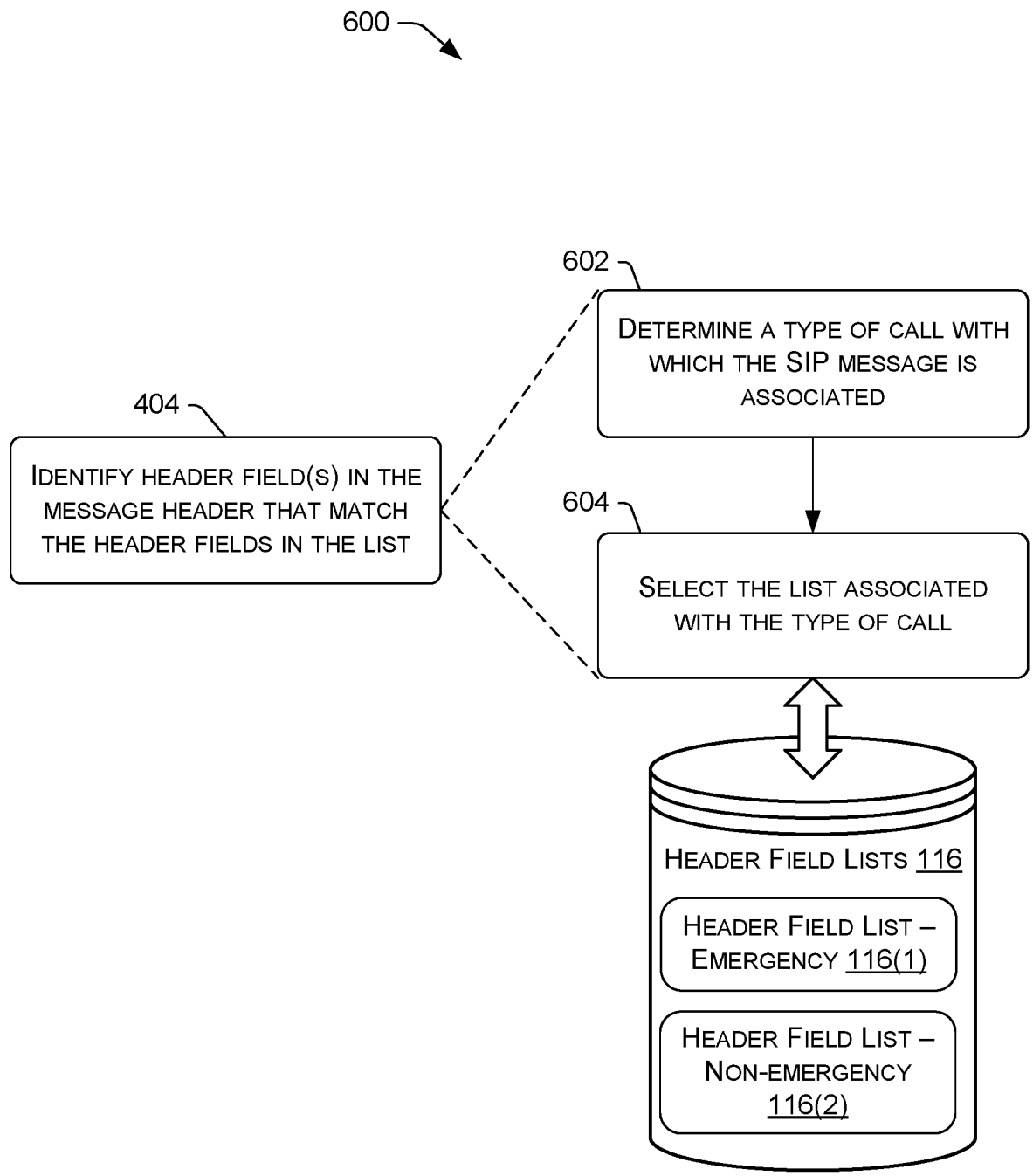
FIG. 6 illustrates a flowchart of an example sub-process for identifying one or more header fields that match a header field(s) in a list of headers fields among multiple available lists associated with different types of sessions, according to various embodiments.

FIG. 6 illustrates a flowchart of an example sub-process 600 for identifying one or more header fields that match a header field(s) in a list of headers fields among multiple available lists associated with different types of communication sessions, according to various embodiments. For example, the process 600 may represent an example sub-process 600 of block 404 of the process 400. The process 600 is described with reference to the previous figures.

At 602, logic (e.g., a processor(s) executing computer-executable instructions) of a communication device 102 may determine a type of call with which an incoming SIP message 108/208/308 is associated. Types of calls may include, without limitation, emergency calls and non-emergency calls. Accordingly, the logic of the communication device 102 may determine, at block 602, that a received SIP message 108/208/308 is associated with an emergency call (or a non-emergency call).

At 604, the logic of the communication device 102 may select a list 116, among multiple lists, that is associated with the determined type of call. As depicted in FIG. 6, the communication device 102 may have access to multiple different lists 116 of header fields, including, without limitation, a first list 116(1) associated with emergency calls and a second list 116(2) associated with non-emergency calls. These lists 116(1) and 116(2) may be different in terms of the header fields (e.g., the field names 118 of the header fields) contained in the respective lists 116. That is, the header fields to be checked for malformation may be different for an emergency call than they are for a non-emergency call. Accordingly, at block 404 of the process 400, the logic of the communication device 102 may identify a subset of header fields 114 within the message header 110 of a SIP message 108/208/308 that match one or more of the header fields in the selected list 116. If the logic of the communication device 102 selects the first list 116(1) based on a determination that the SIP message 108/208/308 is associated with an emergency call, the logic of the communication device 102 may identify a subset of header fields 114 within the message header 110 of the 108/208/308 that match one or more of the header fields in the first list 116(1). That way, the communication device 102 can select the appropriate list 116, among multiple available lists, on-demand, based on the type of call with which the incoming SIP message 108/208/308 is associated.

Figure 7:
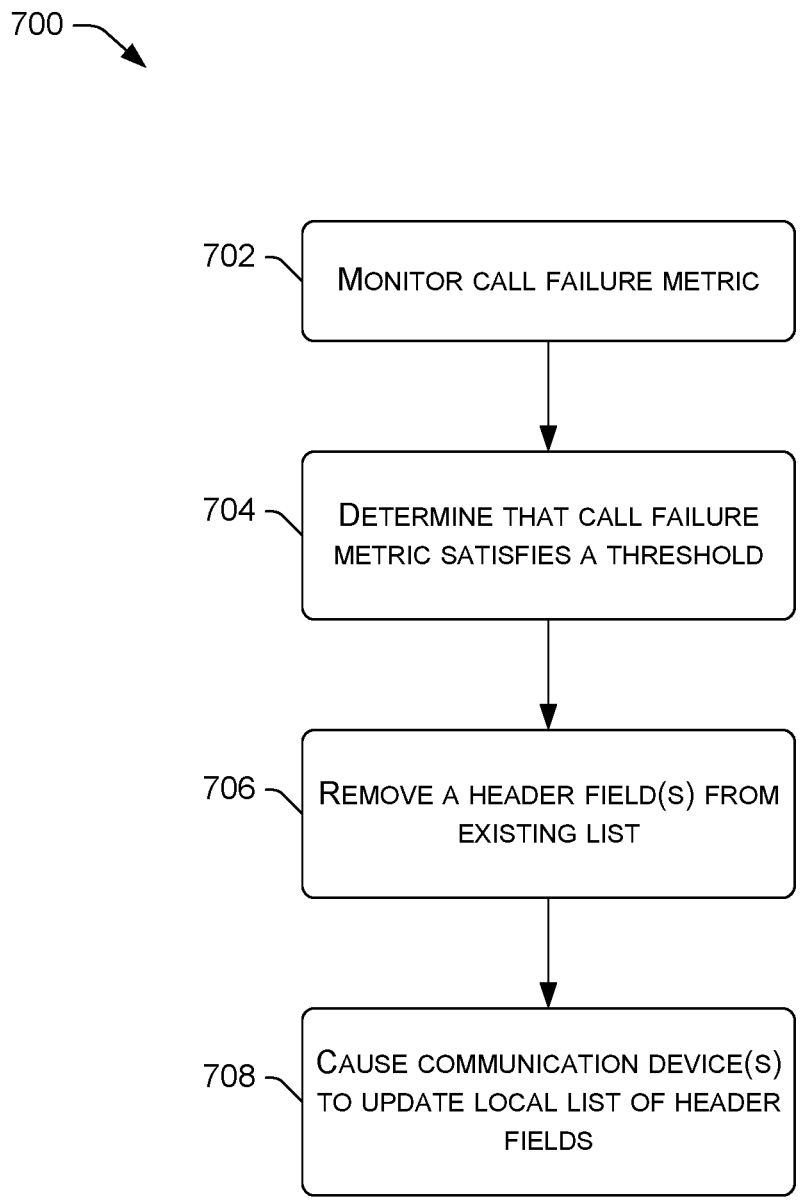
FIG. 7 illustrates a flowchart of an example process for re-configuring a list of header fields based on a monitored call failure metric, according to various embodiments.

FIG. 7 illustrates a flowchart of an example process 700 for re-configuring a list of header fields based on a monitored call failure metric, according to various embodiments. The process 700 is described with reference to the previous figures.

At 702, a computing device may monitor a call failure metric over a period of time while a particular list 116 of header fields is being used to process SIP messages 108/208/308 by a plurality of communication devices 102. A communication device 102 that is repeatedly handling SIP messages 108/208/308, as described herein, such as an IMS node 202 of an IMS network 204, may determine its own call failure metric at block 702 over a period of time, and the communication device 102 may report the call failure metric (e.g., periodically, in response to the occurrence of an event, etc.) to a server computer. Additionally, or alternatively, at block 702, a server computer may receive reports from one or more such communication devices 102 and may monitor a call failure metric across the one or more communication devices 102 that are reporting their own respective metrics.

At 704, the computing device may determine that the call failure metric satisfies a threshold. Satisfying a threshold may include meeting or exceeding the threshold, or it may include strictly exceeding the threshold. In other words, the determination at block 704 may be one where the call failure metric is determined to be higher than expected or higher than an acceptable level of call failures. For example, if the call failure metric is a number of failed calls over a given period of time, the number of failed calls may satisfy the threshold if the number of fails calls is equal to or greater than a threshold number of failed calls at block 704.

At 706, the computing device may determine, based at least in part on the call failure metric (e.g., based on the call failure metric satisfying the threshold), to remove at least one header field from the existing list 116 of header fields, and may remove the header field(s) from the list 116 based on this determination.

At 708, the computing device may cause a communication device(s) 102 to update a local list 116 of header fields based on the removal of the header field(s) at block 706. For example, a communication device 102, at block 708, may receive an updated list 116 of header fields that omits the at least one header field that was removed at block 706, and the communication device 102 may store the updated list 116 in memory for use in processing future SIP messages. Thereafter, the communication device may utilize the updated list 116 for processing SIP messages 108/208/308. This updating of a local list at an individual communication device 102 causes the communication device to refrain from using the removed header field(s) to process future SIP messages 108/208/308. In other words, the communication device 102, after the updating at block 708, will no longer check for malformation of the removed header field(s) in future SIP messages 108/208/308 that are received at the communication device.

Figure 8:
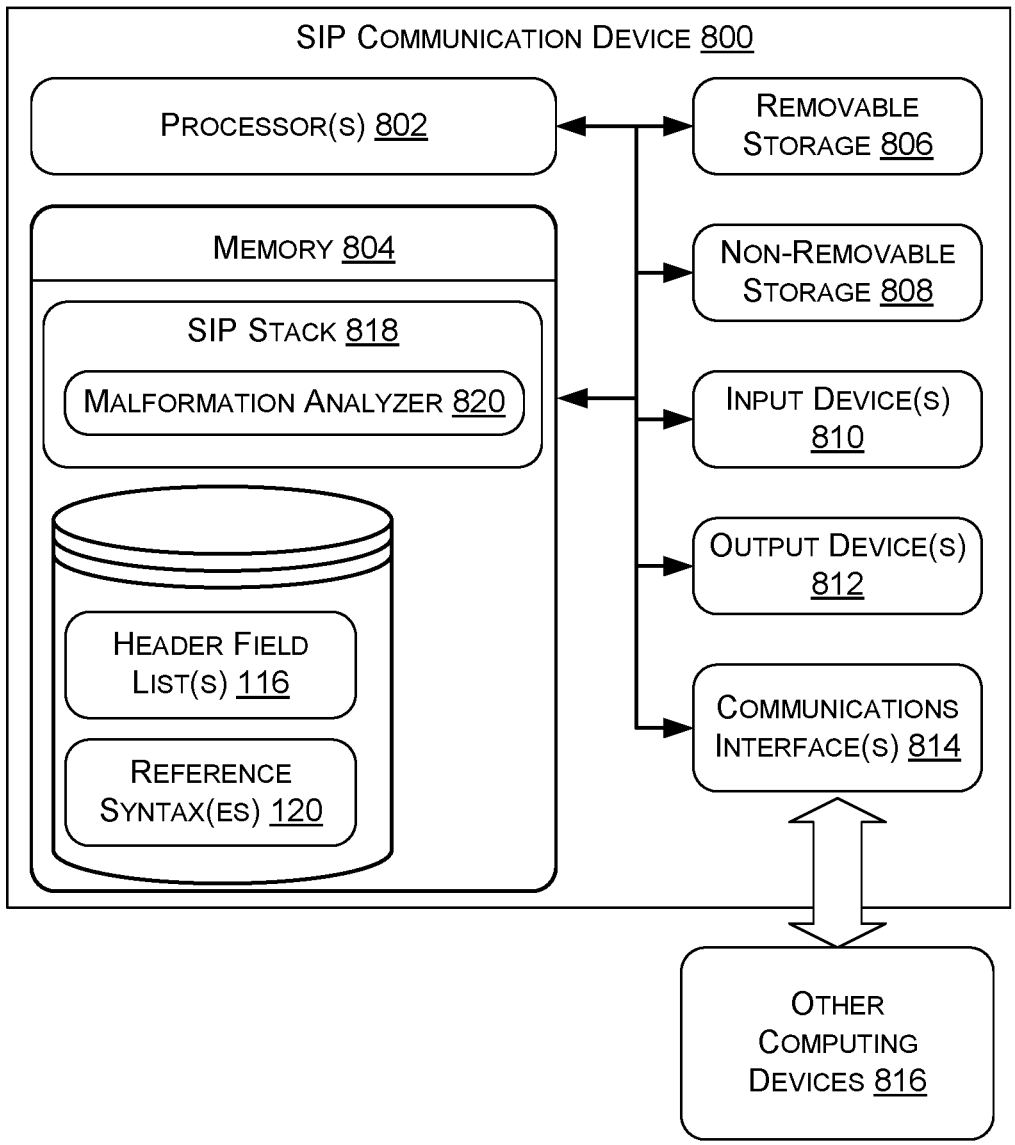
FIG. 8 is a block diagram of an example SIP communication device with logic to handle SIP messages with malformed header fields, according to various embodiments.

FIG. 8 is a block diagram of an example SIP communication device 800 with logic to handle SIP messages with malformed header fields, according to various embodiments. The SIP communication device 800 may be representative of the communication device 102 described herein, which may also represent an IMS node 202 that is configured to process SIP messages to establish, modify, and terminate multimedia sessions.

As shown, the SIP communication device 800 may include one or more processors 802 and one or more forms of computer-readable memory 804 (or, memory 804). The SIP communication device 800 may also include additional storage devices. Such additional storage may include removable storage 806 and/or non-removable storage 808.

The SIP communication device 800 may further include input devices 810 (e.g., a touch screen, keypad, keyboard, mouse, pointer, microphone, etc.) and output devices 812 (e.g., a display, printer, speaker, etc.) communicatively coupled to the processor(s) 802 and the computer-readable memory 804. The SIP communication device 800 may further include a communications interface(s) 814 that allows the SIP communication device 800 to communicate with other computing devices 816 (e.g., UEs, IMS nodes, PSAPs) such as via a network (e.g., the IMS network 204). The communications interface(s) 814 may facilitate transmitting and receiving wired and/or wireless signals over any suitable communications/data technology, standard, or protocol, as described herein. For example, the communications interface(s) 814 can comprise one or more of a cellular radio, a wireless (e.g., IEEE 802.1x-based) interface, a Bluetooth® interface, and so on. In some embodiments, the communications interface(s) 814 may include radio frequency (RF) circuitry that allows the SIP communication device 800 to transition between different RATs, such as transitioning between communication with a 5G NR RAT, a 4G LTE RAT and other legacy RATs (e.g., 3G/2G). The communications interface(s) 814 may further enable the SIP communication device 800 to communicate over circuit-switch domains and/or packet-switch domains.

In various embodiments, the computer-readable memory 804 comprises non-transitory computer-readable memory 804 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 804 may also be described as computer storage media and may include volatile and nonvolatile, removable and non-removable media implemented in any method or technology for storage of information, such as computer readable instructions, data structures, program modules, or other data. Computer-readable memory 804, removable storage 806 and non-removable storage 808 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the SIP communication device 800. Any such computer-readable storage media may be part of the SIP communication device 800.

The memory 804 can include a SIP stack 818 (i.e., computer-executable instructions (or logic) that, when executed, by the processor(s) 802, perform the various acts and/or processes disclosed herein). For example, the SIP stack 818 may include a malformation analyzer 820 configured to identify header fields 114 to be checked for malformation (e.g., by comparing the header fields to a list 116 of header fields, as described herein), and to analyze the identified header fields 122 to determine if their syntaxes match reference syntaxes 120, as described herein. Accordingly, the memory 804 is further shown as storing one or more lists 116 of header fields and one or more reference syntaxes 120 to carry out the malformation analysis on incoming SIP messages. However, it is to be appreciated that this data (i.e., the list(s) 116 and the syntax(es) 120) may be stored elsewhere (e.g., at a remote storage location) so long as the read access speed is sufficiently fast to allow the malformation analyzer 820 to process SIP messages without negatively impacting network traffic.

Figure 9:
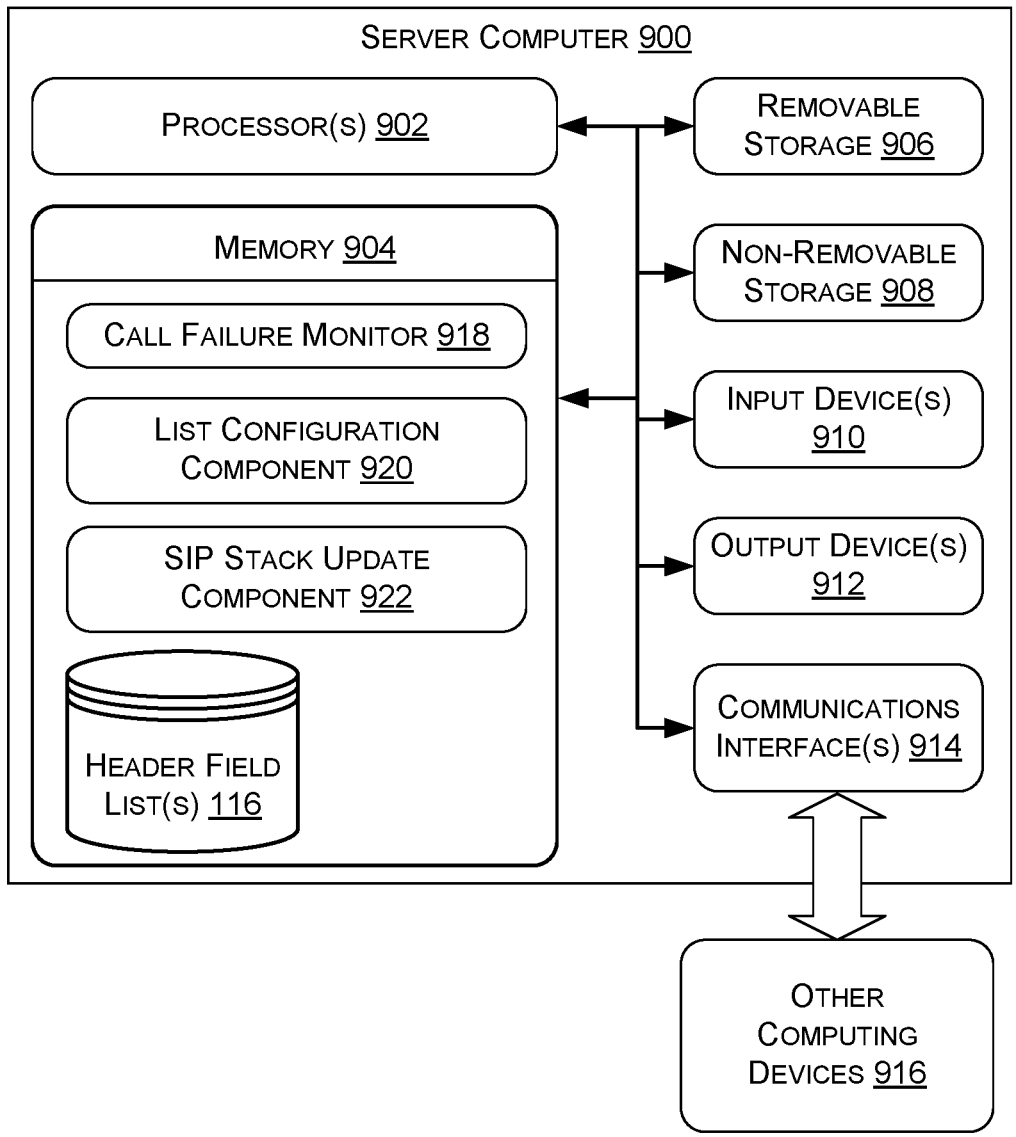
FIG. 9 is a block diagram of an example server computer with logic to update SIP stacks of SIP communication devices with lists of header fields for handing SIP messages with malformed header fields, according to various embodiments.

FIG. 9 is a block diagram of an example server computer 900 with logic to update SIP stacks 818 of SIP communication devices 800 with lists 116 of header fields for handing SIP messages with malformed header fields, according to various embodiments. The server computer 900 may be representative of any suitable computing device that is communicatively coupled to one or more SIP communication devices 800, as described herein, such as by being communicatively coupled to a communication device(s) 102 including, without limitation, an IMS node 202 that is configured to process SIP messages to establish, modify, and terminate multimedia sessions.

As shown, the server computer 900 may include one or more processors 902 and one or more forms of computer-readable memory 904 (or, memory 904). The server computer 900 may also include additional storage devices. Such additional storage may include removable storage 906 and/or non-removable storage 908.

The server computer 900 may further include input devices 910 (e.g., a touch screen, keypad, keyboard, mouse, pointer, microphone, etc.) and output devices 912 (e.g., a display, printer, speaker, etc.) communicatively coupled to the processor(s) 902 and the computer-readable memory 904. The server computer 900 may further include a communications interface(s) 914 that allows the server computer 900 to communicate with other computing devices 916 (e.g., IMS nodes) such as via a network (e.g., the IMS network 204). The communications interface(s) 914 may facilitate transmitting and receiving wired and/or wireless signals over any suitable communications/data technology, standard, or protocol, as described herein.

In various embodiments, the computer-readable memory 904 comprises non-transitory computer-readable memory 904. Reference can be made to the description of the computer-readable memory 804 described above to understand the possible implementations of the computer-readable memory 904, and the computer-readable memory 904 will not be described in further detail for the sake of brevity.

The memory 904 can include a call failure monitor 918, a list configuration component 920, and/or a SIP stack update component 922. These individual components 918/920/922 may represent computer-executable instructions (or logic) that, when executed, by the processor(s) 902, perform the various acts and/or processes disclosed herein. For example, the call failure monitor 918 may monitor a call failure metric as described herein, such as with reference to the process 700 of FIG. 7. The list configuration component 920 may configure/re-configure lists 116 of header fields, such as by removing header fields (e.g., field names 118) or adding field names from/to existing lists 116. The configuration/re-configuration of lists 116 may be based on user input, and/or the configuration/re-configuration may be programmatic (e.g., automated changes to the list(s) 116 based on the monitored call failure metrics, machine learning model output, etc.). In some embodiments, machine learning algorithms may be used to monitor data relating to call failures and data relating to malformed header fields to learn which header fields should or should not be checked for malformation using the techniques described herein, and the list configuration component 920 may configure/re-configure lists 116 based on machine-learned output. The SIP stack update component 922 may be configured to update the SIP stacks 818 and/or the lists 116 of header fields and/or the reference syntaxes 120 on individual SIP communication devices 800 so that the SIP communication devices 800 are configured to properly handle SIP messages with malformed header fields according to the most up-to-date lists 116, syntaxes 120, and/or logic more generally. As lists are configured/re-configured, a repository of header field lists 116 may be stored in the memory 904 and may be deployable to relevant SIP communication devices 800. These lists 116 may be catalogued according to network type, call type, etc., such that a given SIP communication device 800 is updated with the correct or appropriate logic and data.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

I claim:

1. A communication device comprising:
one or more processors; and
memory storing computer-executable instructions that, when executed by the one or more processors, cause the communication device to:
receive a Session Initiation Protocol (SIP) message from an additional communication device, the SIP message including a message header that includes a plurality of first header fields, the plurality of first header fields including a first header field that is malformed;
identify, as one or more identified header fields, a subset of the plurality of first header fields that match one or more second header fields in a list of second header fields accessible to the communication device, the plurality of first header fields including one or more remaining header fields that are omitted from the subset of the plurality of first header fields, the first header field included in the remaining header fields;
determine that the one or more identified header fields are not malformed without determining whether remaining header fields of the plurality of first header fields are malformed; and
process the SIP message including the first header field that is malformed based at least in part on determining that the one or more identified header fields are not malformed.

2. The communication device of claim 1, wherein determining that the one or more identified header fields are not malformed comprises:
comparing a syntax of each header field of the one or more identified header fields to a corresponding reference syntax; and
determining that the syntax matches the corresponding reference syntax.

3. The communication device of claim 1, wherein:
the communication device is an Internet Protocol Multimedia Subsystem (IMS) node of an IMS network; and
the additional communication device is at least one of an additional IMS node or a user equipment (UE).

4. The communication device of claim 3, wherein processing the SIP message includes forwarding the SIP message to at least one of a downstream IMS node or a public safety answering point (PSAP) to establish an emergency call.

5. The communication device of claim 1, wherein:
processing the SIP message includes forwarding the SIP message to a downstream communication device; and
the computer-executable instructions, when executed by the one or more processors, further cause the communication device to:
exchange capability information with the downstream communication device; and
determine, based at least in part on exchanging the capability information, that the downstream communication device will not reject the SIP message based on any of the remaining header fields being malformed.

6. The communication device of claim 1, wherein:
the list of second header fields is a first list associated with emergency calls;
the memory further stores a second list of header fields associated with non-emergency calls, the second list different from the first list; and
the computer-executable instructions, when executed by the one or more processors, further cause the communication device to determine that the SIP message is associated with an emergency call,
wherein identifying the subset comprises identifying the subset of the plurality of first header fields that match one or more second header fields in the first list.

7. The communication device of claim 1, wherein the list is stored in the memory, and wherein the computer-executable instructions, when executed by the one or more processors, further cause the communication device to:

receive an updated list of header fields that omits at least one of the second header fields in the list; and store the updated list in the memory for use in processing future SIP messages.

8. A method comprising:

receiving, by a communication device, from an additional communication device, a Session Initiation Protocol (SIP) message that includes a plurality of first header fields in a message header of the SIP message, the plurality of first header fields including a first header field that is malformed;

identifying, by the communication device, one or more identified header fields of the plurality of first header fields that correspond to one or more second header fields in a list of second header fields accessible to the communication device, the plurality of header fields including one or more remaining header fields that are omitted from the one or more identified header fields, the first header field included in the remaining header fields;

determining, by the communication device, that the one or more identified header fields are not malformed without determining whether the remaining header fields of the plurality of first header fields are malformed; and processing, by the communication device, the SIP message including the first header field that is malformed based at least in part on the determining that the one or more identified header fields are not malformed.

9. The method of claim 8, wherein the determining that the one or more identified header fields are not malformed comprises, for an individual header field of the one or more identified header fields:

comparing a syntax of the individual header field to a corresponding reference syntax; and determining that the syntax matches the corresponding reference syntax.

10. The method of claim 8, wherein:

the communication device is an Internet Protocol Multimedia Subsystem (IMS) node of an IMS network; and the additional communication device is at least one of an additional IMS node or a user equipment (UE).

11. The method of claim 10, wherein the processing of the SIP message includes forwarding the SIP message to a downstream IMS node or a public safety answering point (PSAP) to establish an emergency call.

12. The method of claim 8, wherein:

the processing of the SIP message includes forwarding the SIP message to a downstream communication device; and the method further comprises:

exchanging, by the communication device, capability information with the downstream communication device; and determining, by the communication device, and based at least in part on the exchanging of the capability information, that the downstream communication device will not reject the SIP message based on any of the remaining header fields being malformed.

13. The method of claim 8, wherein:

the list of second header fields is a first list associated with emergency calls;

a second list of header fields associated with non-emergency calls is also accessible to the communication device, the second list different from the first list; and the method further comprises determining, by the communication device, that the SIP message is associated with an emergency call, wherein the identifying of the one or more identified header fields comprises identifying the one or more identified header fields that correspond to the one or more second header fields in the first list.

14. The method of claim 8, further comprising:

monitoring a call failure metric over a period of time while the list of second header fields are being used to process SIP messages;

reporting the call failure metric to a server computer;

receiving an updated list of header fields that omits at least one header field of the second header fields in the list of second header fields; and using the updated list to process future SIP messages.

15. One or more non-transitory computer-readable media storing computer-executable instructions that, when executed by one or more processors, cause the one or more processors to:

receive a Session Initiation Protocol (SIP) message that includes a plurality of first header fields in a message header of the SIP message, the plurality of first header fields including a first header field that is malformed;

identify one or more identified header fields of the plurality of first header fields that correspond to one or more second header fields in a list of second header fields the plurality of header fields including one or more remaining header fields that are omitted from the one or more identified header fields, the first header field included in the remaining header fields;

analyze the one or more identified header fields to determine whether any of the one or more identified header fields are malformed without analyzing remaining header fields of the plurality of first header fields to determine whether the remaining header fields are malformed;

determine that the one or more identified header fields are not malformed; and processing, by the communication device, the SIP message including the first header field that is malformed based at least in part on the determining that the one or more identified header fields are not malformed.

16. The one or more non-transitory computer-readable media of claim 15, wherein analyzing the at least one identified header field comprises:

comparing a syntax of the at least one identified header field to a corresponding reference syntax; and determining that the syntax matches the corresponding reference syntax.

17. The one or more non-transitory computer-readable media of claim 15, wherein the SIP message is received:

by an Internet Protocol Multimedia Subsystem (IMS) node of an IMS network; and from at least one of an additional IMS node or a user equipment (UE).

18. The one or more non-transitory computer-readable media of claim 15, wherein the computer-executable instructions, when executed by the one or more processors, further cause the one or more processors to:

exchange capability information with a downstream communication device to which the SIP message is to be forwarded; and determine, based at least in part on exchanging the capability information, that the downstream communication device will not reject the SIP message based on any of the remaining header fields being malformed.

19. The one or more non-transitory computer-readable media of claim 15, wherein:
- the list of second header fields is a first list of multiple different lists that include at least:
  - the first list associated with emergency calls; and
  - a second list of header fields associated with non-emergency calls, the second list different from the first list; and
- the computer-executable instructions, when executed by the one or more processors, further cause the one or more processors to determine that the SIP message is associated with an emergency call,
- wherein identifying the one or more identified header fields comprises identifying the one or more identified header fields that correspond to the one or more second header fields in the first list.

20. The one or more non-transitory computer-readable media of claim 15, wherein the computer-executable instructions, when executed by the one or more processors, further cause the one or more processors to:
- monitor a call failure metric over a period of time while the list of second header fields are being used to process SIP messages;
- report the call failure metric to a server computer;
- receive an updated list of header fields that omits at least one header field of the second header fields in the list of second header fields; and
- using the updated list to process future SIP messages.

* * * * *